(12) United States Patent
Nakano

(10) Patent No.: US 8,426,522 B2
(45) Date of Patent: Apr. 23, 2013

(54) COPOLYMER RUBBER COMPOSITION, RUBBER FOAMED PRODUCT, AND AUTOMOTIVE SEALANT

(75) Inventor: Sadayuki Nakano, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/293,811

(22) Filed: Nov. 10, 2011

(65) Prior Publication Data
US 2012/0059123 A1     Mar. 8, 2012

Related U.S. Application Data

(63) Continuation of application No. 12/711,754, filed on Feb. 24, 2010, now abandoned.

(30) Foreign Application Priority Data

Feb. 27, 2009   (JP) .................................. 2009-045613

(51) Int. Cl.
- C08F 8/00   (2006.01)
- C08L 9/00   (2006.01)
- C08L 23/00  (2006.01)
- C08L 47/00  (2006.01)

(52) U.S. Cl.
USPC ........... 525/191; 525/232; 525/236; 525/237; 525/240

(58) Field of Classification Search .................. 525/191, 525/232, 236, 237, 240
See application file for complete search history.

(56) References Cited

U.S. PATENT DOCUMENTS

| | | | |
|---|---|---|---|
| 4,895,903 A | 1/1990 | Kobayashi et al. | |
| 5,162,441 A | 11/1992 | Nakata et al. | |
| 5,317,036 A | 5/1994 | Brady, III et al. | |
| 5,710,218 A * | 1/1998 | Nakahama et al. | 525/211 |
| 6,410,650 B1 * | 6/2002 | Koda et al. | 525/191 |
| 2010/0222515 A1 * | 9/2010 | Nakano | 525/232 |

FOREIGN PATENT DOCUMENTS

| | | |
|---|---|---|
| CN | 1310730 A | 8/2001 |
| JP | 55036251 A | 3/1980 |
| JP | 10195259 A | 7/1998 |
| JP | 2000-344980 A | 12/2000 |
| JP | 2002-160327 A | 6/2002 |

OTHER PUBLICATIONS

United States Patent and Trademark Office, "Non-Final Office Action," issued in connection with U.S. Appl. No. 12/712,839, dated Dec. 22, 2011.
Chinese Office Action issued in Application No. 201010126348.7 dated Jul. 4, 2012.
Chinese Office Action issued in application No. 201010126371.6 dated Jul. 4, 2012.
United States Patent and Trademark Office, "Non-Final Office Action," issued in connection with U.S. Appl. No. 13/452,101, dated Jul. 18, 2012.
Non-Final Office Action issued in connection with U.S. Appl. No. 13/452,101, dated Dec. 28, 2012.

* cited by examiner

*Primary Examiner* — Nathan M Nutter
(74) *Attorney, Agent, or Firm* — Sughrue Mion, PLLC

(57) ABSTRACT

The copolymer rubber composition comprises 60 to 75% by weight of a copolymer rubber (1) and 40 to 25% by weight of a copolymer rubber (2), and [iodine value of the copolymer rubber (1)–iodine value of the copolymer rubber (2)] is 5 to 30. The copolymer rubber (1) is an ethylene-α-olefin-non-conjugated polyene copolymer rubber having an ethylene unit of 50 mol % to 70 mol %, an α-olefin unit of 50 mol % to 30 mol %, and an iodine value of 15 to 45, and the copolymer rubber (2) is an ethylene-α-olefinic copolymer rubber having an ethylene unit of more than 70 mol % and 95 mol % or less, an α-olefin unit of less than 30 mol % and 5 mol % or more, and an iodine value of 10 to 30.

5 Claims, No Drawings

COPOLYMER RUBBER COMPOSITION, RUBBER FOAMED PRODUCT, AND AUTOMOTIVE SEALANT

CROSS-REFERENCE TO RELATED APPLICATIONS

This application is a continuation of U.S. patent application Ser. No. 12/711,754 filed Feb. 24, 2010, and now, abandoned, which claims benefit under 35 U.S.C. §119(b) to Japanese Patent Application No. JP 2009-45613 filed Feb. 27, 2009. The disclosure of U.S. patent application Ser. No. 12/711,754 is incorporated herein by reference.

BACKGROUND OF THE INVENTION

1. Field of the Invention

The present invention relates to a copolymer rubber composition, a rubber foamed product, and an automotive sealant.

2. Related Background Art

For automobiles, sealants sealing between car body opening peripheries, and opening/closing members for openings such as doors and trunk lids are used to prevent rain, wind and sounds from the outside. The sealants commonly include a solid member attached to door frames, trunk lids, car body opening peripheries and the like, and a sponge member to seal gaps between car body opening peripheries, and opening/closing members for openings.

The sponge member is required to be deformable to conform to irregularities and curved shapes of door frames, trunk lids and the like, and to have a hardness which allows close contact with door frames, trunk lids and the like, that is, a reasonable rigidity; and as the sponge member, generally used are rubber foamed products obtained by vulcanizing and foaming an ethylene-α-olefin copolymer rubber.

The sponge member is nowadays required to be reduced in the weight and the costs, and it is being studied that the density of rubber foamed products is lowered (raw materials in rubber foamed products are decreased) by raising the foaming ratio of the rubber foamed products.

For example, Japanese Patent Application Laid-Open No. 2000-344980 and 2002-160327 propose a sponge member composed of a rubber foamed product obtained by vulcanizing and foaming a specified ethylene-propylene-nonconjugated diene copolymer rubber compounded with a crystalline polypropylene resin.

SUMMARY OF THE INVENTION

However, in the case where a rubber foamed product of a high foaming ratio is prepared using a conventional ethylene-propylene-nonconjugated diene copolymer rubber, the rigidity of the rubber foamed product is too low in some cases, so the rubber foamed product is still not sufficiently satisfactory.

Under such a situation, the problem the present invention aims to solve is to provide a copolymer rubber composition which can provide a rubber foamed product having a low density and a high rigidity, a rubber foamed product obtained by crosslinking and foaming the copolymer rubber composition, and an automotive sealant having the rubber foamed product as a sponge member.

A first aspect of the present invention is a copolymer rubber composition comprising a copolymer rubber (1), and a copolymer rubber (2) as a rubber component, wherein the content of the copolymer rubber (1) is 60% by weight or more and 75% by weight or less, and the content of the copolymer rubber (2) is 40% by weight or less and 25% by weight or more, based on 100% by weight of the total of the copolymer rubber (1) and the copolymer rubber (2); and [iodine value of the copolymer rubber (1)−iodine value of the copolymer rubber (2)] is 5 or more and 30 or less.

The copolymer rubber (1): an ethylene-α-olefin-nonconjugated polyene copolymer rubber wherein the content of a monomer unit based on ethylene is 50 mol % or more and 70 mol % or less; the content of a monomer unit based on α-olefin is 50 mol % or less and 30 mol % or more (here, the total of the monomer unit based on ethylene and the monomer unit based on α-olefin is 100 mol %); and the iodine value is 15 or more and 45 or less.

The copolymer rubber (2): an ethylene-α-olefin-nonconjugated polyene copolymer rubber wherein the content of a monomer unit based on ethylene is more than 70 mol % and 95 mol % or less; the content of a monomer unit based on α-olefin is less than 30 mol % and 5 mol % or more (here, the total of the monomer unit based on ethylene and the monomer unit based on α-olefin is 100 mol %); and the iodine value is 10 or more and 30 or less.

A second aspect of the present invention is a rubber foamed product obtained by crosslinking and foaming the above-mentioned copolymer rubber composition.

A third aspect of the present invention is an automotive sealant having the above-mentioned rubber foamed product as a sponge member.

The present invention can provide a copolymer rubber composition which can provide a rubber foamed product having a low density and a high rigidity, a rubber foamed product obtained by crosslinking and foaming the copolymer rubber composition, and an automotive sealant having the rubber foamed product as a sponge member.

DESCRIPTION OF THE PREFERRED EMBODIMENTS

A copolymer rubber composition used in the present invention comprises a copolymer rubber (1), and a copolymer rubber (2) as a rubber component.

The copolymer rubber (1): an ethylene-α-olefin-nonconjugated polyene copolymer rubber wherein the content of a monomer unit based on ethylene is 50 mol % or more and 70 mol % or less; the content of a monomer unit based on α-olefin is 50 mol % or less and 30 mol % or more (here, the total of the monomer unit based on ethylene and the monomer unit based on α-olefin is 100 mol %); and the iodine value is 15 or more and 45 or less.

The copolymer rubber (2): an ethylene-α-olefin-nonconjugated polyene copolymer rubber wherein the content of a monomer unit based on ethylene is more than 70 mol % and 95 mol % or less; the content of a monomer unit based on α-olefin is less than 30 mol % and 5 mol % or more (here, the total of the monomer unit based on ethylene and the monomer unit based on α-olefin is 100 mol %); and the iodine value is 10 or more and 30 or less.

α-Olefins of the copolymer rubber (1) and the copolymer rubber (2) are preferably α-olefins having 3 to 20 carbon atoms, and include straight chain α-olefins such as propylene, 1-butene, 1-pentene, 1-hexene, 1-heptene, 1-octene, 1-nonene and 1-decene, and branched α-olefins such as 3-methyl-1-butene, 3-methyl-1-pentene and 4-methyl-1-pentene. These may be used singly or concurrently in two or more. The α-olefins are preferably propylene and 1-butene, and more preferably propylene.

Examples of the nonconjugated polyenes for the copolymer rubber (1) and the copolymer rubber (2) include, for example, chain nonconjugated dienes such as 1,4-hexadiene, 1,6-octadiene, 2-methyl-1,5-hexadiene and 6-methyl-1,5-heptadiene and 7-methyl-1,6-octadiene; cyclic nonconjugated dienes such as cyclohexadiene, dicyclopentadiene, methyltetraindene, 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(5-heptenyl)-2-norbornene, 5-(7-octenyl)-2-norbornene, 5-methylene-2-norbornene, 5-ethylidene-2-norbornene and 6-chloromethyl-5-isopropenyl-2-norbornene; and trienes such as 2,3diisopropylidene-5-norbornene, 2-ethylidene-3-isopropylidene-5-norbornene, 2-propenyl-2,2-norbornadiene, 1,3,7-octatriene, 1,4,9-decatriene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 8,14,16-trimethyl-1,7,14-hexadecatriene and 4-ethylidene-12-methyl-1,11-pentadecadiene. These may be used singly or concurrently in two or more. The nonconjugated polyene is preferably at least one compound selected from the nonconjugated polyene group consisting of 5-ethylidene-2-norbornene, dicyclopentadiene and 5-vinyl-2-norbornene.

Examples of the ethylene-α-olefin-nonconjugated polyene copolymer rubbers as the copolymer rubber (1) and the copolymer rubber (2) include, for example, ethylene-propylene-5-ethylidene-2-norbornene copolymer rubbers, ethylene-propylene-dicyclopentadiene copolymer rubbers, ethylene-propylene-5-vinyl-2-norbornene copolymer rubbers, ethylene-1-butene-5-ethylidene-2-norbornene copolymer rubbers, ethylene-1-butene-dicyclopentadiene copolymer rubbers and ethylene-1-butene-5-vinyl-2-norbornene copolymer rubbers.

In the copolymer rubber (1), the content of a monomer unit based on ethylene (ethylene unit) is 50 mol % or more and 70 mol % or less, and the content of a monomer unit based on α-olefin (α-olefin unit) is 50 mol % or less and 30 mol % or more. In order to enhance the rigidity and the low temperature resistance, preferably, the content of an ethylene unit is 55 mol % or more and 68 mol % or less, and the content of an α-olefin unit is 45 mol % or less and 32 mol % or more; and more preferably, the content of an ethylene unit is 60 mol % or more and 68 mol % or less, and the content of an α-olefin unit is 40 mol % or less and 32 mol % or more. Here, the total of the content of the ethylene unit and the content of the α-olefin unit is 100 mol %.

The iodine value (g/100 g polymer) of the copolymer rubber (1) is 15 or more and 45 or less. In order to lower the density (raise the foaming ratio), the iodine value is preferably 18 or more and 40 or less, and more preferably 20 or more and 35 or less.

In the copolymer rubber (2), the content of an ethylene unit is more than 70 mol % and 95 mol % or less, and the content of an α-olefin unit is less than 30 mol % and 5 mol % or more. In order to enhance the rigidity and the low temperature resistance, preferably, the content of an ethylene unit is 75 mol % or more and 90 mol % or less, and the content of an α-olefin unit is 25 mol % or less and 10 mol % or more; and more preferably, the content of an ethylene unit is 80 mol % or more and 90 mol % or less, and the content of an α-olefin unit is 20 mol % or less and 10 mol % or more. Here, the total of the content of the ethylene unit and the content of the α-olefin unit is 100 mol %.

The iodine value (g/100 g polymer) of the copolymer rubber (2) is 10 or more and 30 or less. In order to lower the density (raise the foaming ratio) and raise the rigidity, the iodine value is preferably 10 or more and 25 or less, and more preferably 10 or more and 20 or less.

[Iodine value of the copolymer rubber (1)−iodine value of the copolymer rubber (2)] is 5 or more and 30 or less. In order to enhance the rigidity, the difference is preferably 7 or more, and more preferably 10 or more. In order to reduce the compression set, the difference is preferably 25 or less, and more preferably 20 or less.

In the copolymer rubber composition, the content of the copolymer rubber (1) is 60% by weight or more and 75% by weight or less, and the content of the copolymer rubber (2) is 40% by weight or less and 25% by weight or more. In order to enhance the rigidity and the kneading processability, preferably, the content of the copolymer rubber (1) is 60% by weight or more and 75% by weight or less, and the content of the copolymer rubber (2) is 40% by weight or less and 25% by weight or more; and more preferably, the content of the copolymer rubber (1) is 63% by weight or more and 70% by weight or less, and the content of the copolymer rubber (2) is 37% by weight or less and 30% by weight or more.

In the copolymer rubber composition, the limiting viscosity [η] of a rubber component composed of the copolymer rubber (1) and the copolymer rubber (2) is, in order to enhance the strength and the kneading processability, preferably 1 dl/g or more and 10 dl/g or less, more preferably 1.5 dl/g or more and 8 dl/g or less, and still more preferably 1.8 dl/g or more and 5 dl/g or less. The limiting viscosity [η] is measured in tetralin at 135° C.

In the copolymer rubber composition, the molecular weight distribution (a ratio: Mz/Mn of the Z-average molecular weight (Mz) and the number-average molecular weight (Mn) in terms of polystyrenes) of a rubber component composed of the copolymer rubber (1) and the copolymer rubber (2) is, in order to enhance the strength and the kneading processability, preferably 3 to 7. Further in order to enhance the strength, the molecular weight distribution is preferably unimodal.

Methods for manufacturing a rubber component composed of the copolymer rubber (1) and the copolymer rubber (2) include a method using two tanks coupled in series involving manufacturing one of the copolymer rubber (1) and the copolymer rubber (2) in a first reaction tank, feeding the one copolymer rubber manufactured in the first reaction tank to a second reaction tank, and manufacturing the other copolymer rubber in the second reaction tank in the presence of the one copolymer rubber. For example, the method includes one in which ethylene, an α-olefin, a nonconjugated polyene, a solvent, hydrogen and a polymerization catalyst are fed to a first reaction tank to manufacture one of the copolymer rubber (1) and the copolymer rubber (2) in the first reaction tank; and the one copolymer rubber manufactured in the first reaction tank, ethylene, an α-olefin, a nonconjugated polyene, a solvent, hydrogen and a polymerization catalyst are fed to a second reaction tank to manufacture the other copolymer rubber in the second reaction tank.

Polymerization catalysts used in manufacture of the copolymer rubber (1) are suitably those containing a vanadium compound represented by formula (1) and an organoaluminum compound represented by formula (2) as polymerization catalyst components.

formula (1): $VO(OR)_m X_{3-m}$ wherein R denotes a straight chain hydrocarbon group having 1 to 8 carbon atoms; X denotes a halogen atom; and m denotes a number satisfying $0 \leq m \leq 3$.

formula (2): $R''_j AlX''_{3-j}$ wherein R'' denotes a hydrocarbon group; X'' denotes a halogen atom; and j denotes a number satisfying $0 < j \leq 3$.

In formula (1), R denotes a straight chain hydrocarbon group having 1 to 8 carbon atoms, and includes, for example, straight chain alkyl groups having 1 to 8 carbon atoms such as a methyl group, an ethyl group, a n-propyl group, a n-butyl group, a n-pentyl group and a n-hexyl group. Preferable are straight chain alkyl groups having 1 to 3 carbon atoms. X denotes a halogen atom, and includes a chlorine atom. m denotes a number satisfying $0 \leq m \leq 3$, and preferably a number satisfying $0 \leq m \leq 2$.

Vanadium compounds represented by formula (1) include $VOCl_3$, $VO(OCH_3)Cl_2$, $VO(OC_2H_5)Cl_2$, $VO(O(n-C_3H_7))Cl_2$, $VO(O(n-C_4H_9))Cl_2$, $VO(O(n-C_5H_{11}))Cl_2$, $VO(O(n-C_6H_{13}))Cl_2$, $VO(O(n-C_7H_{15}))Cl_2$, $VO(O(n-C_8H_{17}))Cl_2$, $VO(OCH_3)_{0.5}Cl_{2.5}$, $VO(OC_2H_5)_{0.5}Cl_{2.5}$, $VO(O(n-C_3H_7))_{0.5}Cl_{2.5}$, $VO(O(n-C_4H_9))_{0.5}Cl_{2.5}$, $VO(O(n-C_5H_{11}))_{0.5}Cl_{2.5}$, $VO(O(n-C_6H_{13}))_{0.5}Cl_{2.5}$, $VO(O(n-C_7H_{15}))_{0.5}Cl_{2.5}$, $VO(O(n-C_8H_{17}))_{0.5}Cl_{2.5}$, $VO(OCH_3)_{1.5}Cl_{0.5}$, $VO(OC_2H_5)_{1.5}Cl_{0.5}$, $VO(O(n-C_3H_7))_{1.5}Cl_{0.5}$, $VO(O(n-C_4H_9))_{1.5}Cl_{0.5}$, $VO(O(n-C_5H_{11}))_{1.5}Cl_{0.5}$, $VO(O(n-C_6H_{13}))_{1.5}Cl_{0.5}$, $VO(O(n-C_7H_{15}))_{1.5}Cl_{0.5}$, $VO(O(n-C_8H_{17}))_{1.5}Cl_{0.5}$, $VO(OCH_3)_{0.8}Cl_{2.2}$, $VO(OC_2H_5)_{0.8}Cl_{2.2}$, $VO(O(n-C_3H_7))_{0.8}Cl_{2.2}$, $VO(O(n-C_4H_9))_{0.8}Cl_{2.2}$, $VO(O(n-C_5H_{11}))_{0.8}Cl_{2.2}$, $VO(O(n-C_6H_{13}))_{0.8}Cl_{2.2}$, $VO(O(n-C_7H_{15}))_{0.8}Cl_{2.2}$ and $VO(O(n-C_8H_{17}))_{0.8}Cl_{2.2}$. Preferable are $VOCl_3$, $VO(OC_2H_5)Cl_2$, $VO(OC_2H_5)_{0.5}Cl_{2.5}$, $VO(OC_2H_5)_{1.5}Cl_{0.5}$ and $VO(OC_2H_5)_{0.8}Cl_{2.2}$.

A vanadium compound represented by formula (1) is obtained by a method in which $VOX_3$ and ROH are reacted in a predetermined molar ratio. For example, the reaction of $VOCl_3$ and $C_2H_5OH$ is indicated by the following formula.

$VOCl_3 + m.C_2H_5OH \rightarrow VO(OC_2H_5)_mCl_{3-m} + m.HCl$

In formula (2), R" denotes a hydrocarbon group, and includes, for example, alkyl groups having 1 to 10 carbon atoms such as a methyl group, an ethyl group, a n-propyl group, an iso-propyl group, a n-butyl group, an iso-butyl group, a pentyl group and a hexyl group. X" denotes a halogen atom, and includes a chlorine atom. j denotes a number satisfying $0 < j \leq 3$, and preferably $1 \leq m \leq 2$.

Organoaluminum compounds represented by formula (2) are exemplified by $(C_2H_5)_3AlCl$, $(n-C_4H_9)_2AlCl$, $(iso-C_4H_9)_2AlCl$, $(n-C_6H_{13})_2AlCl$, $(n-C_2H_5)_{1.5}AlCl_{1.5}$, $(n-C_4H_9)_{1.5}AlCl_{1.5}$, $(iso-C_4H_9)_{1.5}AlCl_{1.5}$, $(n-C_6H_{13})_{1.5}AlCl_{1.5}$, $C_2H_5AlCl_2$, $(n-C_4H_9)AlCl_2$, $(iso-C_4H_9)AlCl_2$ and $(n-C_6H_{13})AlCl_2$.

Polymerization catalysts used in manufacture of the copolymer rubber (2) are suitably those having a vanadium compound represented by formula (3) and an organoaluminum compound represented by formula (2) as polymerization catalyst components.

formula (3): $VO(OR')_nX'_{3-n}$ wherein R' denotes a secondary or tertiary hydrocarbon group having 3 to 8 carbon atoms; X' denotes a halogen atom; and n denotes a number satisfying $0 < n \leq 3$.

In formula (3), R' denotes a secondary or tertiary hydrocarbon group having 3 to 8 carbon atoms, and includes, for example, secondary or tertiary alkyl groups having 3 to 8 carbon atoms such as an iso-propyl group, a sec-butyl group and a tert-butyl group. Preferable are secondary or tertiary alkyl groups having 3 to 4 carbon atoms. X' denotes a halogen atom, and includes a chlorine atom. n denotes a number satisfying $0 < n \leq 3$, and preferably $0.5 < n \leq 2$.

Vanadium compounds represented by formula (3) include $VO(O(iso-C_3H_7))Cl_2$, $VO(O(iso-C_3H_7))_{0.5}Cl_{2.5}$, $VO(O(iso-C_3H_7))_{1.5}Cl_{0.5}$ and $VO(O(iso-C_3H_7))_{0.8}Cl_{2.2}$. Preferable is $VO(O(iso-C_3H_7))_{0.8}Cl_{2.2}$.

A vanadium compound represented by formula (3) is obtained by a method in which $VOX'_3$ and R'OH are reacted in a predetermined molar ratio. For example, the reaction of $VOCl_3$ and $iso-C_3H_7OH$ is indicated by the following formula.

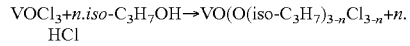

$VOCl_3 + n.iso-C_3H_7OH \rightarrow VO(O(iso-C_3H_7))_{3-n}Cl_{3-n} + n.HCl$

In manufacture of the copolymer rubber (1) and the copolymer rubber (2), the molar ratio of the use amounts of the organoaluminum compound and the vanadium compound (molar number of the organoaluminum compound/molar number of the vanadium compound) is preferably 2.5 to 50.

Solvents usable are inactive solvents including aliphatic hydrocarbons such as propane, butane, isobutane, pentane, hexane, heptane and octane; and alicyclic hydrocarbons including such as cyclopentane and cyclohexane.

The polymerization temperature is ordinarily −20 to 200° C., preferably 0 to 150° C., and more preferably 20 to 120° C. The polymerization pressure is ordinarily 0.1 to 10 MPa, preferably 0.1 to 5 MPa, and more preferably 0.1 to 3 MPa.

The copolymer rubber composition may contain additives, for example, a vulcanizing agent, a vulcanizing coagent, a vulcanizing accelerator, a softening agent, a reinforcing agent, a foaming agent, a foaming coagent, a stabilizer and a deforming agent.

Vulcanizing agents usable are sulfur, sulfur-based compounds, organic peroxides, and the like. Sulfur usable includes powdery sulfur, precipitated sulfur, colloidal sulfur, surface-treated sulfur and insoluble sulfur. The use amount of sulfur and sulfur-based compounds is preferably 0.01 to 10 parts by weight, and more preferably 0.1 to 5 parts by weight, with respect to 100 parts by weight of the rubber component in a copolymer rubber composition.

Examples of the organic peroxides include dicumyl peroxide, 2,5-dimethyl-2,5-di(tert-butylperoxy)hexane, 2,5-dimethyl-2,5-di(benzoylperoxy)hexane, 2,5-dimethyl-2,5-(tert-butylperoxy)hexyne-3, di-tert-butyl peroxide, di-tert-butyl peroxide-3,3,5-trimethylcyclohexane and tert-butyl hydroperoxide. Preferable are dicumyl peroxide, di-tert-butyl peroxide and di-tert-butyl peroxide-3,3,5-trimethylcyclohexane, and more preferable is di-tert-butyl peroxide-3,3,5-trimethylcyclohexane. The use amount of the organic peroxides is preferably 0.1 to 15 parts by weight, and more preferably 1 to 8 parts by weight, with respect to 100 parts by weight of the rubber component in a copolymer rubber composition.

Vulcanizing coagents for sulfur or sulfur-based compounds include metal oxides such as magnesium oxide and zinc oxide. Preferable is zinc oxide. The compounding amount of the vulcanizing coagents is preferably 1 to 20 parts by weight with respect to 100 parts by weight of the rubber component in a copolymer rubber composition.

Examples of the vulcanizing coagents for organic peroxides include triallyl isocyanurate, N,N'-m-phenylene bismaleimide, methacrylic acid, methyl methacrylate, ethyl methacrylate, propyl methacrylate, isopropyl methacrylate, n-butyl methacrylate, i-butyl methacrylate, sec-butyl methacrylate, t-butyl methacrylate, 2-ethylhexyl methacrylate, cyclohexyl methacrylate, isodecyl methacrylate, lauryl methacrylate, tridecyl methacrylate, stearyl methacrylate, 2-hydroxyethyl methacrylate, hydroxypropyl methacrylate, polyethylene glycol monomethacrylate, polypropylene glycol monomethacrylate, 2-ethoxyethyl methacrylate, tetrahydrofurfuryl methacrylate, allyl methacrylate, glycidyl methacrylate, benzyl methacrylate, dimethylaminoethyl methacrylate, diethylaminoethyl methacrylate, methacryloxyethyl phosphate, 1,4-butanediol diacrylate, ethylene glycol dimethacrylate, 1,3-butylene glycol dimethacrylate, neopentyl glycol dimethacrylate, 1,6-hexanediol dimethacrylate, diethylene glycol dimethacrylate, triethylene glycol dimethacrylate, polyethylene glycol dimethacrylate, dipropylene glycol dimethacrylate, polypropylene glycol dimethacrylate, trimethylolethane trimethacrylate, trimethylolpropane trimethacrylate, allyl glycidyl ether, N-methylol methacrylamide, 2,2-bis(4-methacryloxypolyethoxyphenyl)propane, aluminum methacrylate, zinc methacrylate, calcium methacrylate, magnesium methacrylate and 3-chloro-2-hydroxypropyl methacrylate. The compounding amount of the vulcanizing coagents is preferably 0.05 to 15 parts by weight, and more preferably 0.1 to 8 parts by weight, with respect to 100 parts by weight of the rubber component in a copolymer rubber composition.

Examples of the vulcanizing accelerators include tetramethylthiuram disulfide, tetraethylthiuram disulfide, tetrabutylthiuram disulfide, dipentamethylenethiuram monosulfide, dipentamethylenethiuram disulfide, dipentamethylenethiuram tetrasulfide, N,N'-dimethyl-N,N'-diphenylthiuram disulfide, N,N'-dioctadecyl-N,N'-diisopropylthiuram disulfide, N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole, dibenzothiazyl disulfide, diphenylguanidine, triphenylguanidine, diorthotolylguanidine, orthotolylbiguanide, diphenylguanidine phthalate, acetaldehyde-aniline reaction products, butylaldehyde-aniline condensates, hexamethylenetetramine, acetaldehyde ammonia, 2-mercaptoimidazoline, thiocarbanilide, diethylthiourea, dibutylthiourea, trimethylthiourea, diorthotolylthiourea, zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthate and ethylene thiourea. The compounding amount of the vulcanizing accelerators is preferably 0.05 to 20 parts by weight, and more preferably 0.1 to 8 parts by weight, with respect to 100 parts by weight of the rubber component in a copolymer rubber composition.

Examples of the softening agents include petroleum softening agents such as process oil, lubricants, paraffin, liquid paraffin, petroleum asphalt and vaseline; coal tar softening agents such as coal tar and coal tar pitch; fatty oil softening agents such as castor oil, linseed oil, rapeseed oil and coconut oil; waxes such as tall oil, factice, beeswax, carnauba wax and lanolin; fatty acids and fatty acid salts such as ricinoleic acid, palmitic acid, barium stearate, calcium stearate and zinc laurate; and synthetic polymer materials such as petroleum resins, atactic polypropylene and cumarone indene resins. The compounding amount of the softening agents is preferably 1 to 300 parts by weight, more preferably 20 to 250 parts by weight, and still more preferably 50 to 200 parts by weight, with respect to 100 parts by weight of the rubber component in a copolymer rubber composition.

Examples of the reinforcing agents include carbon black, silica, calcium carbonate, micropowder talc and micropowder aluminum silicate. Carbon blacks include SRF, GPF, FEF, MAF, HAF, ISAF, SAF, FT and MT. These carbon blacks may be surface treated with a silane coupling agent. The compounding amount of the reinforcing agents is preferably 1 to 300 parts by weight, more preferably 20 to 250 parts by weight, and still more preferably 50 to 200 parts by weight, with respect to 100 parts by weight of the rubber component in a copolymer rubber composition.

Examples of the foaming agents include inorganic foaming agents such as sodium bicarbonate, sodium carbonate, ammonium bicarbonate, ammonium carbonate and ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutyronitrile, azobiscyclohexylnitrile, azodiaminobenzene and barium azodicarboxylate; sulfonyl hydrazide compounds such as benzenesulfonyl hydrazide, toluenesulfonyl hydrazide, P,P'-oxybis(benzenesulphonyl hydrazide) and diphenylsulfone-3,3'-disulfonyl hydrazide; and azide compounds such as calcium azide, 4,4'-diphenyldisulfonyl azide and p-toluenesulfonyl azide. The compounding amount of the foaming agents is preferably 0.01 to 15 parts by weight, and more preferably 0.05 to 8 parts by weight, with respect to 100 parts by weight of the rubber component in a copolymer rubber composition.

Examples of the foaming coagents include organic acids such as salicylic acid, phthalic acid, stearic acid and oxalic acid; and urea and its derivatives. The compounding amount of the foaming coagents is preferably 0.01 to 15 parts by weight, and more preferably 0.05 to 8 parts by weight, with respect to 100 parts by weight of the rubber component in a copolymer rubber composition.

Examples of the stabilizers include amine antioxidants, hindered phenolic antioxidants and sulfur antioxidants. The compounding amount of the stabilizers is preferably 0.01 to 15 parts by weight, and more preferably 0.05 to 8 parts by weight, with respect to 100 parts by weight of the rubber component in a copolymer rubber composition.

Examples of the defoaming agents include calcium oxide. The compounding amount of the defoaming agents is preferably 0.05 to 20 parts by weight, and more preferably 0.1 to 8 parts by weight, with respect to 100 parts by weight of the rubber component in a copolymer rubber composition.

The copolymer rubber composition may contain resins as required. Examples of the resins include polyethylene resins, polypropylene resins, polybutene, poly-4-methyl-pentene-1, polystyrene, polyester, polyamide and polyphenylene ether. Examples of the polyethylene resins include high-density polyethylene, middle-density polyethylene, low-density polyethylene and straight chain low-density polyethylene.

As methods for compounding the above-mentioned additives to the copolymer rubber composition, well-known preparation methods of rubber compounds can be used. A rubber compound can be prepared, for example, by kneading a softening agent, a reinforcing agent, a stabilizer and the like with a copolymer rubber at a temperature of 80 to 170° C. for 3 to 10 min using an internal mixer such as a Banbury mixer, a kneader or an Intermix, and then, as required, adding a vulcanizing agent, a vulcanizing accelerator, a vulcanizing coagent and the like and kneading the mixture at a temperature of 40 to 80° C. for 5 to 30 min using a roll such as an open roll or a kneader. Thus, a ribbon-shaped or sheet-shaped composition (compounded rubber) is ordinarily obtained. In the case where the kneading temperature in the above-mentioned internal mixer is less than the decomposition temperature of a vulcanizing agent and a foaming agent, the vulcanizing agent and the foaming agent may be simultaneously kneaded.

The copolymer rubber composition is suitably molded through vulcanization, foaming and molding into rubber foamed products, which are used as automobile industry components such as automotive sealants (weather strips, door glass run channels and the like), window frames, radiator hoses, brake components and wiper blades; industrial rubber products such as rubber rolls, belts, packings and hoses; electric insulating materials such as anode caps and grommets; civil engineering and building supplies such as architectural gaskets and construction sheets; rubberized cloth; insulating materials; cushioning materials and the like.

Methods for manufacturing a rubber foamed product by vulcanization foaming include a method in which a rubber composition compounded with additives such as a crosslinking agent and a foaming agent is molded into a molded product having a desired shape by a well-known molding machine (for example, an extruder, a calender roll molding machine, a press molding machine, an injection molding machine and a transfer molding machine), and simultaneously at molding or after molding, the molded product is heated to vulcanize and foam the molded product; and a method in which a rubber composition compounded with additives such as a foaming agent is molded into a molded product having a desired shape by a above-mentioned well-known molding machine, and simultaneously at molding or after molding, the molded product is heated to foam the molded product, and then irradiated with an electron beam to vulcanize the molded product.

In a method of vulcanization-foaming or foaming by heating, a heating tank and a metal mold having heating means, such as hot air, glass beads fluidized bed, UHF (ultrahigh frequency electromagnetic wave), steam and LCM (hot molten salt bath), can be used. The heating temperature is preferably 150 to 270° C.; and the heating time is preferably 1 to 30 min In a method of vulcanization by electron beam irradiation, the energy of the electron beam is preferably 0.1 to 10 MeV, and more preferably 0.3 to 2 MeV. The irradiation is carried out so that the absorbed dose becomes preferably 0.5 to 35 Mrad, and more preferably 0.5 to 10 Mrad.

The rubber foamed product is suitably used as a sponge member of an automotive sealant. The density of the rubber foamed product used for the sponge member is preferably 0.3 to 0.6 kg/L.

EXAMPLES

Hereinafter, the present invention will be described further in detail by way of Examples and Comparative Examples.

[Methods of Measurements and Evaluations]
(1) The Ethylene Unit Amount and the Propylene Unit Amount A copolymer rubber and a copolymer rubber composition were each molded into a film of about 0 1 mm in thickness by a hot press machine, and the film was measured for the infrared absorption spectrum by an infrared spectrophotometer (IR-810, made by JASCO Corp.). The ethylene unit amount and the propylene unit amount were determined from the infrared absorption spectrum according to a method described in literature (Takayama, Usami, et al., "Characterization of Polyethylene by Infrared Absorption Spectrum", or Mc Rae, M. A., Madam S, W. F., et al., Die Makromolekulare Chemie, 177, 461 (1976)).

(2) The Iodine Value

A copolymer rubber and a copolymer rubber composition were each molded into a film of about 0 5 mm in thickness by a hot press machine, and the film was measured for the intensity of a peak (absorption peak at 1,688 $cm^{-1}$) originated from 5-ethylidene-2-norbornene by an infrared spectrophotometer. The molar content of double bonds was determined from the peak intensity and the iodine value was calculated from the molar content.

(3) The Molecular Weight Distribution

The Z-average molecular weight (Mz) and the number-average molecular weight (Mn) were measured by gel permeation chromatography (GPC) under the conditions (1) to (9) described below, and the molecular weight distribution (Mz/Mn) was determined.

(1) Apparatus: 150C made by Waters
(2) Separation column. Shodex Packed ColumnA-80M made by Showa Denko K.K.
(3) Measurement temperature: 140° C.
(4) Carrier: ortho dichlorobenzene
(5) Flow rate: 1.0 mL/min
(6) Sample concentration: about 1 mg/1 mL
(7) Sample injection amount: 400 µL
(8) Detector: Differential refraction
(9) Molecular weight standard substance: standard polystyrenes (4) The Limiting Viscosity The limiting viscosity was measured in a tetralin solution at 135° C. using an Ubbelohde viscometer.

(5) The Density

A rubber foamed product prepared in a length of 50 mm was measured for the weight in the air and the buoyancy when immersed in water, in an atmosphere of 23° C. The volume of the rubber foamed product was determined from the buoyancy; and the density was calculated from the weight/the volume.

(6) The Rigidity

A rubber foamed product was cut out to a strip No. 1-type test piece prescribed in JIS K6254-1993. The test piece was twice elongated by 37.5% relative to the bench mark distance (40 mm) at an atmospheric temperature of 23° C. at a tensile rate of 50 mm/min using a Tensilon universal tester (1210A, made by Orientec Co., Ltd.). Then, it was elongated by 25% relative to the bench mark distance and the tensile stress at the elongation was measured.

Example 1

(The Preparation of a Copolymer Rubber Composition)

Hexane, ethylene and propylene were fed at respective rates of 754 g/(hr·L), 34.4 g/(hr·L) and 90.5 g/(hr·L) per unit time and per unit polymerization tank volume to a stainless steel first polymerization tank equipped with a stirrer. $VOCl_3$ and ethanol were mixed and stirred at respective rates of 59.5 mg/(hr·L) and 28.6 mg/(hr·L) ($VOCl_3$/ethanol=1/1.8 (molar ratio)) in a line mixer, and thereafter, the mixture was fed to the polymerization tank. Further, ethylaluminum sesquichloride (EASC) and hydrogen were fed at respective rates of 339.3 mg/(hr·L) and 0.04 NL/(hr·L) to the polymerization tank. Further, 5-ethylidene-2-norbornene was fed at a rate of 9.86 g/(hr·L) to the polymerization tank. The temperature of the polymerization tank was held at 40° C.

In the polymerization tank, a copolymer rubber was produced at a rate of 40 g/(hr·L) per unit time and per unit polymerization tank volume. The ethylene unit amount/the propylene unit amount (molar ratio) of the copolymer rubber was 0.66/0.34; and the iodine value was 30.2 (g/100 g polymer).

The polymerization solution extracted from the first polymerization tank was fed to a stainless steel second polymerization tank having the same volume as that of the first polymerization tank and equipped with a stirrer. Hexane and ethylene were fed at respective rates of 345 g/(hr·L) and 29.4 g/(hr·L) per unit time and per unit polymerization tank volume. $VO(O(iso-C_3H_7))_{0.8}Cl_{2.2}$ was fed at a rate of 26.7 mg/(hr·L) to the second polymerization tank. Further, ethylaluminum sesquichloride (EASC) and hydrogen were fed at respective rates of 53.4 mg/(hr·L) and 0.083 NL/(hr·L) to the polymerization tank. The temperature of the polymerization tank was held at 60° C.

The polymerization solution extracted from the second polymerization tank was analyzed, revealing that the production amount of a copolymer rubber composition (hereinafter, referred to as EPDM-A) was 64 g/(hr·L) per unit time and per unit polymerization tank volume; the ethylene unit amount/the propylene unit amount (molar ratio) of the copolymer rubber composition was 0.74/0.26; the iodine value was 24.7 (g/100 g polymer); the limiting viscosity was 2.0 dL/g and the molecular weight distribution was 3.8.

It was revealed that in the second polymerization tank, a copolymer rubber was produced at a rate of 24 g/(hr·L) per unit time and per unit polymerization tank volume; the ethylene unit amount/the propylene unit amount (molar ratio) of the copolymer rubber was 0.86/0.13; and the iodine value was 15.3 (g/100 g polymer).

(The Compounding of Additives)
Step 1

100 parts by weight of EPDM-A, 5 parts by weight of zinc oxide (META-Z L102, made by Inoue Calcium corp.), 1 part by weight of stearic acid, 102 parts by weight of SRF carbon black (Asahi 50HG, made by Asahi Carbon Co., Ltd.), 22 parts by weight of talc (Mistron Vapor, made by Nippon Talc Co., Ltd.) and 60 parts by weight of a process oil (Diana PS430, made by Idemitsu Kosan Co., Ltd.) were kneaded in a Banbury mixer to obtain a kneaded material. In the kneading, the temperature of the Banbury mixer at the start of the kneading was set at 80° C.; the rotation frequency of the rotor, at 60 rpm; and the kneading time, for 5 min.
Step 2

The above-mentioned kneaded material, and 3 parts by weight of calcium oxide (Vesta PP, made by Inoue Calcium Corp.), 3.4 parts by weight of 4,4'-oxybis(benzenesulfonyl hydrazide) (Neocellborn N1000SW, made by Eiwa Chemical Ind. Co., Ltd.), 1.8 parts by weight of azodicarbonamide (Vinyfor AC#3, made by Eiwa Chemical Ind. Co., Ltd.), 0.63 parts by weight of zinc dimethyldithiocarbamate (Rhenogran ZDMC-80, made by Rhein Chemie Rheinau GmbH), 1.13 parts by weight of zinc dibutyldithiocarbamate (Rhenogran ZDBC-80, made by Rhein Chemie Rheinau GmbH), 0.72 parts by weight of dipentamethylenethiuram tetrasulfide (Rhenogran DPTT-70, made by Rhein Chemie Rheinau GmbH), 1.88 parts by weight of 2-mercaptobenzothiazole (Rhenogran MBT-80, made by Rhein Chemie Rheinau GmbH), 1.75 parts by weight of 2-mercaptoimidazoline (Rhenogran ETU-80, made by Rhein Chemie Rheinau GmbH), 0.75 parts by weight of morpholine disulfide (Nocmaster R80E, made by Ouchi Shinko Chemical Industrial Co., Ltd.), 0.4 parts by weight of 2-mercaptobenzothiazole zinc salt (Accel MZ, made by Kawaguchi Chemical Industry Co., Ltd.) and 1.2 parts by weight of sulfur with respect to 100 parts by weight of EPDM-A in the kneaded material were mixed in an 8-inch open roll at a roll temperature of 50° C. to obtain a copolymer rubber composition.

(Preparation of a Rubber Foamed Product)

The copolymer rubber composition obtained in Step-2 was extruded to a sheet 20 mm wide and 2 mm thick using a 45 mm-Φ vent-type extruder (45VAK EXTRUDER, made by Nakata Engineering Co., Ltd.). Then, the sheet was charged in a hot air vulcanization apparatus (HAV, made by Micro Denshi Co., Ltd.) at 230° C. for 5 min to simultaneously perform foaming and vulcanization to obtain a rubber foamed product. Evaluation results of the foamed product are shown in Table 1.

Comparative Example 1

(Preparation of a Copolymer Rubber Composition)

Hexane, ethylene and propylene were fed at respective rates of 1.118 kg/(hr·L), 33.4 g/(hr·L) and 165.2 g/(hr·L) per unit time and per unit polymerization tank volume to a stainless steel first polymerization tank equipped with a stirrer. VOCl3 was fed at a rate of 118.5 mg/(hr·L) to the polymerization tank. Further, ethylaluminum sesquichloride (EASC) and hydrogen were fed at respective rates of 710.8 mg/(hr·L) and 0.003 NL/(hr·L) to the polymerization tank. Further, 5-ethylidene-2-norbornene was fed at a rate of 9.08 g/(hr·L) to the polymerization tank. The temperature of the polymerization tank was held at 46° C.

In the polymerization tank, a copolymer rubber was produced at a rate of 41 g/(hr·L) per unit time and per unit polymerization tank volume. The ethylene unit amount/the propylene unit amount (molar ratio) of the copolymer rubber was 0.63/0.37; the iodine value was 24.0 (g/100 g polymer).

The polymerization solution extracted from the first polymerization tank was fed to a stainless steel second polymerization tank having the same volume as that of the first polymerization tank and equipped with a stirrer. Hexane, ethylene and propylene were fed at respective rates of 539 g/(hr·L), 8.8 g/(hr·L) and 0.76 g/(hr·L) per unit time and per unit polymerization tank volume. VOCl3 was fed at a rate of 80.6 mg/(hr·L) to the second polymerization tank. Further, ethylaluminum sesquichloride (EASC) was fed at a rate of 483.5 mg/(hr·L) to the polymerization tank. Further, 5-ethylidene-2-norbornene was fed at a rate of 0.76 g/(hr·L) to the polymerization tank. The temperature of the polymerization tank was held at 56° C.

The polymerization solution extracted from the second polymerization tank was analyzed, revealing that the production amount of a copolymer rubber composition (hereinafter, referred to as EPDM-B) was 59 g/(hr·L) per unit time and per unit polymerization tank volume; the ethylene unit amount/the propylene unit amount (molar ratio) of the copolymer rubber composition was 0.64/0.36; the iodine value was 23.5 (g/100 g polymer); the limiting viscosity was 2.0 dl/g; and the molecular weight distribution was 2.7.

It was revealed that in the second polymerization tank, a copolymer rubber was produced at a rate of 18 g/(hr·L) per unit time and per unit polymerization tank volume; the ethylene unit amount/the propylene unit amount (molar ratio) of the copolymer rubber was 0.63/0.37; and the iodine value was 22.4 (g/100 g polymer).

(Compounding of Additives, and Preparation of Rubber Foamed Products)

Rubber foamed products were obtained as in "Compounding of additives" and "Preparation of rubber foamed products" in Example 1, except for using EPDM-B in place of EPDM-A. Evaluation results of the rubber foamed products are shown in Table 1.

TABLE 1

|  | Example 1 | Comparative Example 1 |
|---|---|---|
| Compounding (parts by weight) | | |
| Step 1 | | |
| EPDM-A | 100 | |
| EPDM-B | | 100 |
| Zinc Oxide | 5 | 5 |
| Stearic Acid | 1 | 1 |
| SRF Carbon Black | 102 | 102 |

TABLE 1-continued

|  | Example 1 | Comparative Example 1 |
|---|---|---|
| Talc | 22 | 22 |
| Process Oil | 60 | 60 |
| Step 2 |  |  |
| Calcium Oxide | 3 | 3 |
| 4,4'-oxybis (benzenesulfonyl hydrazide) | 3.4 | 3.4 |
| Azodicarbonamide | 1.8 | 1.8 |
| Zinc Dimethyldithiocarbamate | 0.63 | 0.63 |
| Zinc Dibutyldithiocarbamate | 1.13 | 1.13 |
| Dipentamethylene thiuram tetrasulfide | 0.72 | 0.72 |
| 2-mercaptobenzothiazole | 1.88 | 1.88 |
| 2-mercaptoimidazoline | 1.75 | 1.75 |
| Morpholine Disulfide | 0.75 | 0.75 |
| 2-mercaptobenzothiazole Zinc Salt | 0.4 | 0.4 |
| Sulfur | 1.2 | 1.2 |
| Evaluations |  |  |
| Density (kg/L) | 0.41 | 0.48 |
| Rigidity (kPa) | 242 | 199 |

What is claimed is:

1. A method for producing a copolymer rubber composition comprising:
a copolymer rubber (1); and
a copolymer rubber (2), as a rubber component,
wherein the content of the copolymer rubber (1) is 60% by weight or more and 75% by weight or less, and the content of the copolymer rubber (2) is 40% by weight or less and 25% by weight or more, based on 100% by weight of the total of the copolymer rubber (1) and the copolymer rubber (2); and [iodine value of the copolymer rubber (1)–iodine value of the copolymer rubber (2)] is 5 or more and 30 or less, and
wherein,
the copolymer rubber (1) is an ethylene-α-olefin-nonconjugated polyene copolymer rubber wherein the molar ratio of monomer units based on ethylene to monomer units based on α-olefin is 50/50 or more and 70/30 or less; and the iodine value is 15 or more and 45 or less, and
the copolymer rubber (2) is an ethylene-α-olefin-nonconjugated polyene copolymer rubber wherein the molar ratio of monomer units based on ethylene to monomer units based on α-olefin is more than 70/30 and 95/5 or less; and the iodine value is 10 or more and 30 or less,
the method comprising
manufacturing one of the copolymer rubber (1) and the copolymer rubber (2) in a first reaction tank, feeding the one copolymer rubber manufactured in the first reaction tank to a second reaction tank, and manufacturing the other copolymer rubber in the second reaction tank,
wherein the two tanks are coupled in series, and
wherein the manufacturing of the copolymer rubber (1) is conducted in the presence of a polymerization catalyst containing a vanadium compound represented by formula (1) and an organoaluminum compound represented by formula (2) as polymerization catalyst components,
formula (1): $VO(OR)_m X_{3-m}$ wherein R denotes a straight chain hydrocarbon group having 1 to 8 carbon atoms; X denotes a halogen atom: an m denotes a number satisfying $0 \leq m \leq 3$;
formula (2): $R''_j AlX''_{3-j}$ wherein R" denotes a hydrocarbon group; X" denotes a halogen atom; and j denotes a number satisfying $0 < j \leq 3$; and
wherein the manufacturing of the copolymer rubber (2) is conducted in the presence of a polymerization catalyst containing a vanadium compound represented by formula (3) and the organoaluminum compound represented by formula (2) as polymerization catalyst components,
formula (3): $VO(OR')_n X'_{3-n}$ wherein R' denotes a secondary or tertiary hydrocarbon group having 3 to 8 carbon atoms; X' denotes a halogen atom; and n denotes a number satisfying $0 < n \leq 3$.

2. The method according to claim 1, wherein ethylene, an α-olefin, a nonconjugated polyene, a solvent, hydrogen and a polymerization catalyst are fed to the first reaction tank to manufacture one of the copolymer rubber (1) and the copolymer rubber (2) in the first reaction tank; and the one copolymer rubber manufactured in the first reaction tank, ethylene, an α-olefin, a nonconjugated polyene, a solvent, hydrogen and a polymerization catalyst are fed to the second reaction tank to manufacture the other copolymer rubber in the second reaction tank.

3. The method according to claim 1, wherein the α-olefin is a propylene, and the nonconjugated polyene is at least one compound selected from the nonconjugated polyene group consisting of 5-ethylidene-2-norbornene, dicyclopentadiene and 5-vinyl-2-norbornene.

4. The method according to claim 1, which further comprises the steps of vulcanizing and foaming the resulting copolymer rubber composition to a density of 0.3 kg/L or higher and 0.6 kg/L or lower to obtain a rubber foamed product.

5. The method according to claim 4, wherein the rubber foamed product is a sponge member for an automotive sealant.

* * * * *